(No Model.) 2 Sheets—Sheet 1.

U. H. PALMER.
HAY STACKER.

No. 495,831. Patented Apr. 18, 1893.

Witnesses
G. S. Elliott

Urban H. Palmer
Inventor
by
Attorney

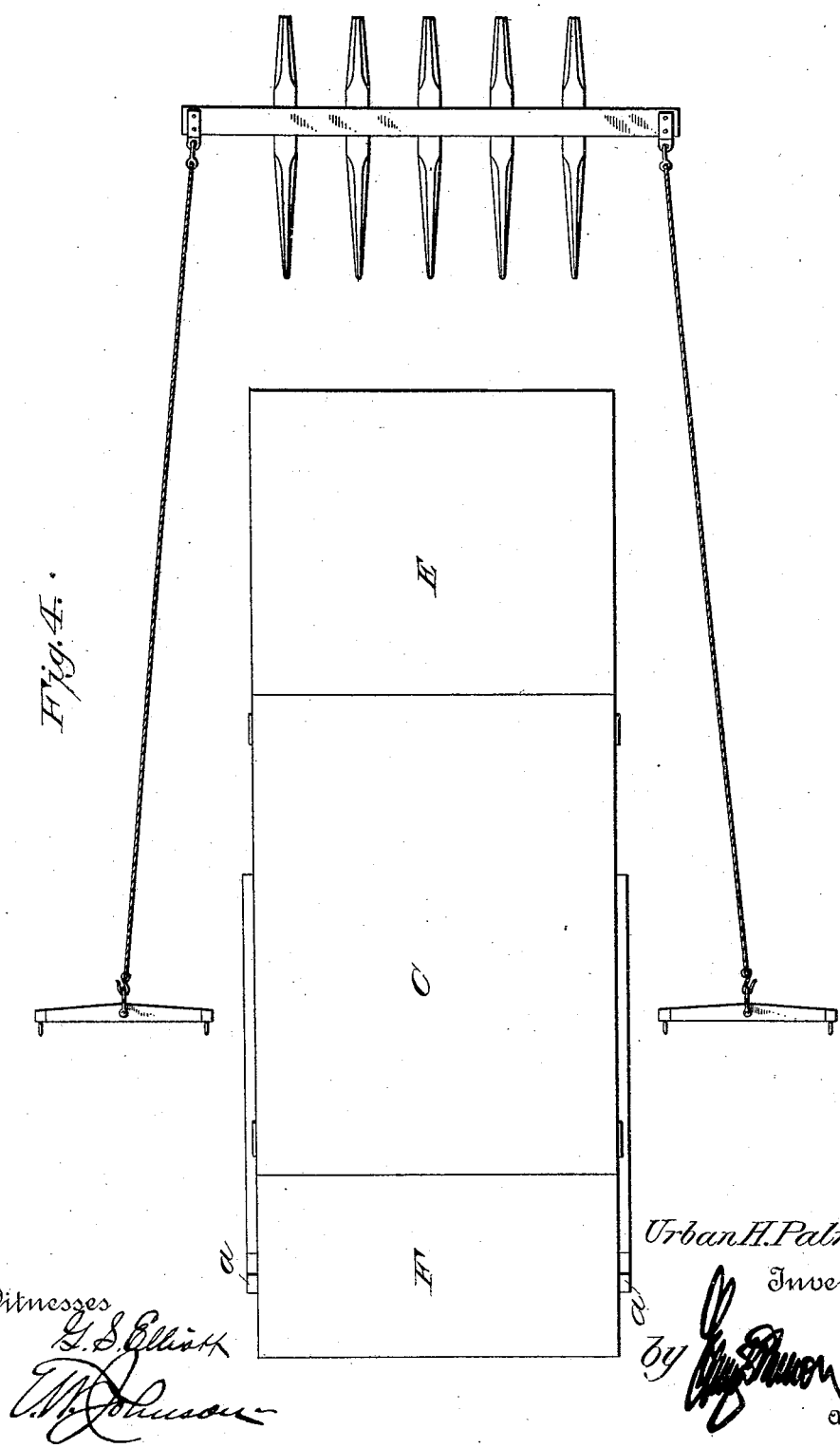

UNITED STATES PATENT OFFICE.

URBAN H. PALMER, OF ST. JAMES, MINNESOTA.

HAY-STACKER.

SPECIFICATION forming part of Letters Patent No. 495,831, dated April 18, 1893.

Application filed December 22, 1892. Serial No. 456,068. (No model.)

*To all whom it may concern:*

Be it known that I, URBAN H. PALMER, a citizen of the United States of America, residing at St. James, in the county of Watonwan and State of Minnesota, have invented certain new and useful Improvements in Hay-Elevators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in hay stackers.

The object of the invention is to provide a portable hay stacker, which has an adjustable inclined way carrying a hinged section at each end, as will be hereinafter fully set forth, and particularly pointed out in the claims.

Figure 1:
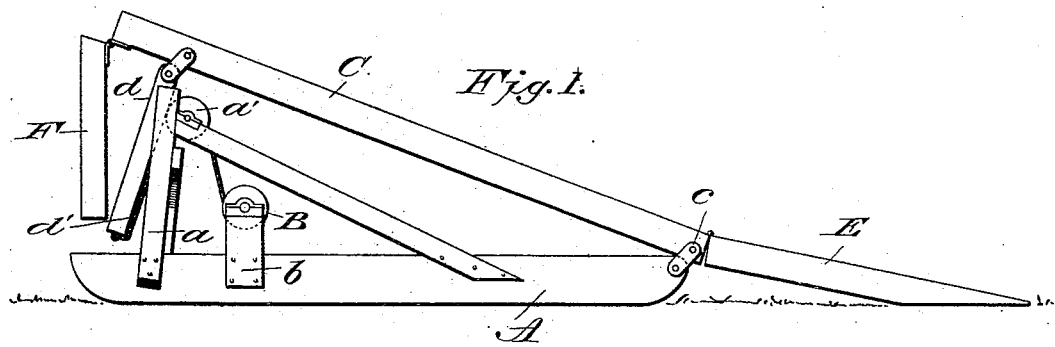
Figure 2:
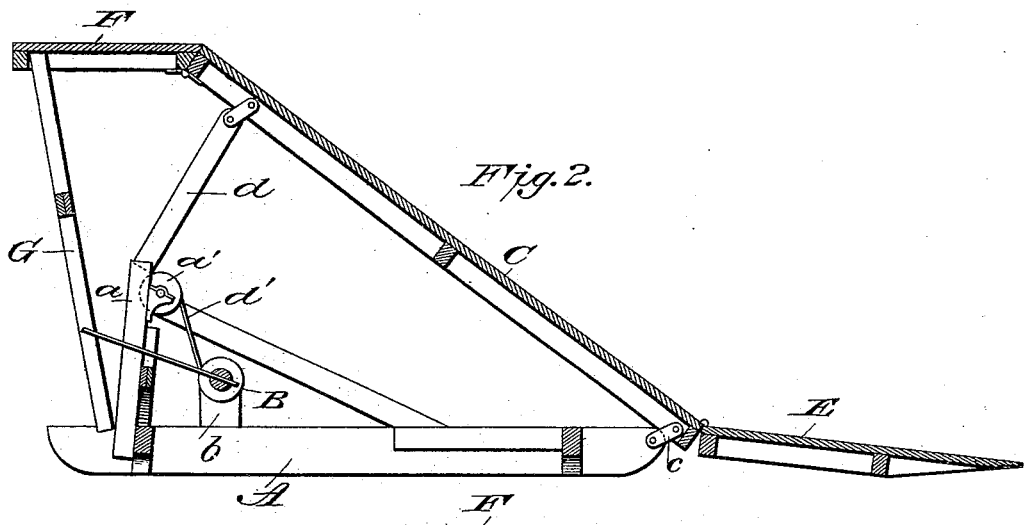
Figure 3:
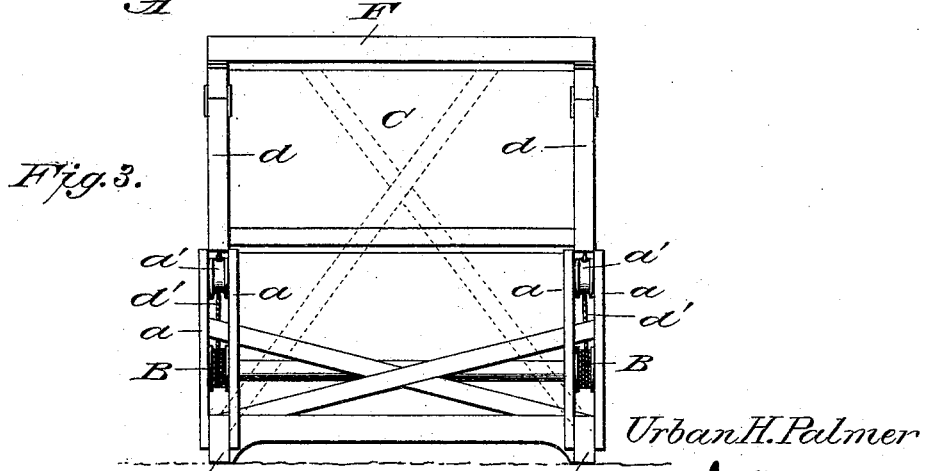

In the accompanying drawings, forming part of this specification: Figure 1 is a side elevation showing a hay stacker constructed in accordance with my invention, the inclined way being adjusted to its lowest extent. Fig. 2 is a longitudinal sectional view showing the inclined way elevated to its highest extent. Fig. 3 is an end elevation. Fig. 4 is a plan view.

A A designate the runners, which are suitably braced to each other and have rigidly secured near one end uprights $a$ $a$ adjacent to which are journaled guide rollers $a'$. To the runners are also rigidly secured uprights $b$ $b$, which support a windlass B.

C designates an inclined plane, which is hinged by connections $c$ to the forward end of the runners, and near the upper end of this incline, and to each side of the same, are hinged downwardly extending supports $d$ $d$, to the lower ends of which are attached flexible connections $d'$ which pass over the guide rollers $a'$ and from there to the windlass B.

E designates a section which is hinged to the lower end of the incline C, and is adapted to extend to and rest upon the ground when the apparatus is in use.

F designates a platform, which is hinged to the upper end of the incline C and is adapted to be maintained in a horizontal position by crossed braces G when the incline C is elevated to its highest extent; and when the incline is lowered or at an intermediate inclination the platform is permitted to hang down as shown in Fig. 1. This platform is used when loading hay upon a wagon or in finishing off hay stacks.

In stacking hay with the stacker hereinbefore described an ordinary rake is used, and the lower section E resting upon the ground the rake can travel thereon and up the incline to elevate the hay. As the hay is being stacked the upper end of the incline can be elevated by turning the windlass, and when it is at the highest point the section F may be supported in a horizontal position, and the hay may be fed therefrom upon the stack or an operator may stand upon the same.

Having thus described my invention, what I claim as new, and desire to secure by Letters Patent, is—

1. In combination with the runners A, an incline C hinged thereto and provided with sections E and F, the section E being adapted to rest upon the ground and the section F adapted to be supported in a horizontal position, substantially as shown, and for the purpose set forth.

2. In a hay stacker, the combination of the runners A A having uprights $a$ and $b$, guide rollers $a'$ and a windlass B journaled upon said uprights, an incline C hinged at one end to the runners and provided with supports $d$, flexible connections attached to the lower ends of said supports and guided over the rollers $a'$ to the windlass, and a section E hinged to the lower end of the incline, the parts being organized substantially as shown and adapted to be used with a hay rake, for the purpose set forth.

In testimony whereof I affix my signature in presence of two witnesses.

URBAN H. PALMER.

Witnesses:
 M. E. MULLEN,
 NELLIE E. MULLEN.